United States Patent
Inoue

(10) Patent No.: US 6,683,911 B1
(45) Date of Patent: Jan. 27, 2004

(54) STREAM EDITING APPARATUS AND STREAM EDITING METHOD

(75) Inventor: Shuji Inoue, Zama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/514,195

(22) Filed: Feb. 28, 2000

(51) Int. Cl.⁷ .............................. H04B 1/66; H04N 9/87; H04N 5/93; H04N 7/12; G06K 9/46

(52) U.S. Cl. .................. 375/240.26; 386/4; 386/52; 382/232; 348/423.1; 370/342

(58) Field of Search ......................... 375/240, 240.26, 375/240.03, 240.1, 240.13, 240.01, 240.28; 386/4, 52, 55, 53; 370/342, 36; 348/423.1, 584; 369/47.3; 725/32

(56) References Cited

U.S. PATENT DOCUMENTS

| | | | |
|---|---|---|---|
| 6,038,000 A | * 3/2000 | Hurst, Jr. | 375/240.26 |
| 6,137,834 A | * 10/2000 | Wine et al. | 375/240 |
| 6,330,214 B1 | * 12/2001 | Ohta et al. | 369/47.3 |
| 6,345,122 B1 | * 2/2002 | Yamato et al. | 382/232 |
| 6,480,539 B1 | * 11/2002 | Ramaswamy | 375/240.03 |

FOREIGN PATENT DOCUMENTS

| | | | |
|---|---|---|---|
| CN | 1236522 A | 11/1999 | |
| EP | 0656729 | 6/1995 | |
| EP | 0692911 | 1/1996 | |
| EP | 0888007 | 12/1998 | |
| EP | 0903742 | 3/1999 | |
| EP | 0923243 | 6/1999 | |
| EP | 0982726 A1 | * 1/2000 | G11B/20/10 |
| GB | 2327548 | 1/1999 | |
| WO | WO 9936912 | 7/1999 | |

* cited by examiner

*Primary Examiner*—Gims Philippe
(74) *Attorney, Agent, or Firm*—Connely Bove Lodge & Hutz LLP

(57) ABSTRACT

A stream editing system is provided which is designed to switch one of two input streams used in an editing operation to the other at an edit point set in each of the streams. The system includes two decoders and at least one encoder. In the editing operation to combine the two streams to produce a single stream, the system re-encodes only a trailing portion of one of the streams with a leading portion of the other stream which are defined across the edit points and uses the other portions of the streams as they are, thereby minimizing a deterioration in signal quality caused by the re-encoding of the streams.

2 Claims, 9 Drawing Sheets ional data using the discrete cosine transform (DTC)
STREAM EDITING APPARATUS AND STREAM EDITING METHOD

BACKGROUND OF THE INVENTION

1. Technical Field of the Invention

The present invention relates generally to a stream editing apparatus designed to edit streams consisting of a combination of video and audio data codes, and more particularly to a stream editing apparatus designed to connect two streams, in real time, to produce a single stream without deterioration in image quality.

2. Background Art

In the MPEG format that is a typical one of video and audio code compression coding techniques, compression coding of moving pictures is achieved by decreasing the amount of data using the discrete cosine transform (DTC) and predictive coding.

FIG. 11 shows an encoder designed to perform such a coding operation.

The encoder includes a subtractor 41, a DCT circuit 42, a quantizer 43, a variable length coding circuit 49, a buffer 50, an inverse quantizer 44, an inverse DCT circuit 45, an adder 46, an image memory 47, and a motion vector detector 48.

When the interframe predictive coding is performed, the motion vector detector 48 compares input image data with image data stored in the image memory 47 to calculate a motion vector (MV) and outputs it to the image memory 47 and the variable length coding circuit 49.

The subtractor 41 reads motion-compensated image data out of the image memory 47 and outputs a difference between the input image data and the image data read from the image memory 47 to the DCT circuit 42. The DCT circuit 42 performs the discrete cosine transform on the difference data inputted from the subtractor 41 and outputs DCT coefficients thereof to the quantizer 43 to inform the variable length coding circuit 49 of the type of the DCT.

The quantizer 43 quantizes the DCT coefficients at quantization steps specified by quantizer matrix (Quant) from the buffer 50 and outputs results of the quantization and the quantizer matrix (Quant) to the variable length coding circuit 49. The results of the quantization are also outputted to the inverse quantization circuit 44.

The variable length coding circuit 49 codes a motion vector (MV) calculated by the motion vector detector 48, the type of DCT, the quantizer matrix (Quant), and the output of the quantizer 43. These coded data are stored in the buffer 50 temporarily and then outputted in the form of a stream.

The output of the quantizer 43 is also inverse-quantized by the inverse quantizer 44 and then subjected to the inverse DCT in the inverse DCT circuit 45. The output of the inverse DCT circuit 45 is added by the adder 46 to the image data read out of the image memory 47 to reproduce the input image data which is, in turn, stored in the image memory 47 again for use in the subtraction operation on a subsequent input image data.

When the intraframe coding is performed which does not use the interframe prediction, only the DCT is performed without reading the image data out of the image memory 47.

When the interframe prediction is used, the forward interframe predictive coding using a previous image stored in the image memory 47 and the backward interframe predictive coding using a future image stored in the image memory 47 may also be performed.

In the MPEG format, each input frame is coded into one of three pictures: an I-picture containing only intra-macroblocks, a P-picture containing intra- and forward interframe predictive coded microblocks, and a B-picture containing intra-, forward interframe predictive coded, and backward interframe predictive coded macroblocks.

FIGS. 10(a) to 10(d) show a sequence of processes which adds audio data to video data coded in the above described manner to produce a data stream in a format suitable for a storage medium.

Moving pictures are placed in an frame order different from that when they are inputted and coded into I-, P-, and B-pictures to produce a video elementary stream (ES). The audio data is compressed at an interval of, for example, 24 ms. to produce an audio ES. These ESs are each divided into suitable units and packetized together with headers. To each header, a PTS (Presentation Time Stamp) is added which indicates the time the packtized data is to be reproduced.

The thus formed video and audio packets are multiplexed as a pack along with a header to form a stream FIG. 9 shows typical packed streams. The streams are recorded in a storage medium such as a DVD. The playback is achieved by reading the streams out of the storage medium and decoding and reproducing each packet at the time specified by the PTS.

Usually, production of streams of desired contents from a plurality of streams recorded in a storage medium is accomplished by reading the streams out of the storage medium and rearranging them. For instance, when it is required to split a stream A into two sections and replace a stream B between them to produce a stream C, the first section of the stream A is decoded and then encoded again to prepare a leading portion of the stream C, after which the second section of the stream A is decoded and then encoded again to produce a trailing portion of the stream C. Such stream editing, however, encounters a drawback in that the re-encoding operation degrades the quality of edited image.

Editing techniques for coupling the streams directly to each other are also proposed, but they are subjected to restriction that the streams should be coupled at an I-picture of video data.

In the MPEG format, video data is grouped in units of a GOP (Group of Pictures) consisting of one I-picture and a plurality of P- and B-pictures. Each GOP usually contains fifteen (15) pictures (0.5 sec.). If a streams is divided at one of the P-pictures or the B-pictures, it is difficult to reproduce a frame image in units of a picture, thus leading to a problem that the image continues to be distorted until a subsequent I-picture appears.

The above editing is usually performed in an off-line operation and thus consumes much time.

SUMMARY OF THE INVENTION

It is therefore a principal object of the present invention to avoid the disadvantages of the prior art.

It is another object of the present invention to provide a stream editing system designed to connect two streams, in real time, to produce a single stream without deterioration in signal quality such as image quality.

According to one aspect of the invention, there is provided a stream editing apparatus which is designed to switch one of two input streams used in an editing operation to the other at an edit point set in each of the streams. The system comprises: (a) a first decoder decoding a first stream; (b) a second decoder decoding a second stream; (c) an encoder re-encoding at least one of the first and second streams decoded by the first and second decoders; and (d) a controller controlling editing of the first and second streams to produce a third stream made up of a combination of a leading segment of the first stream preceding the edit point set in the first stream and a trailing segment of the second stream following the edit point set in the second stream, the controller, in producing the third stream, combining a portion of at least one of the leading and trailing segments of the first and second streams which is decoded and re-encoded by a corresponding one of the first and second decoders and the encoder and which is defined to have a given length from the edit point set in the one of the first and second streams with other portions of the leading and trailing segments of the first and second streams before decoded and re-encoded by the first and second decoders and the re-encoder.

In the preferred mode of the invention, each of the first and second streams is made up of a plurality of groups of pictures (GOP). The controller defines the length of the portion which is decoded and re-encoded and which is to be combined in the third stream from edit point to a leading portion of one of the GOPs in which the edit point is set.

A header generator may further be provided which generates a series of headers for the third stream.

The encoder may re-encode the at least one of the first and second streams using coding information derived by decoding the at least one of the first and second streams through the first and second decoders.

The coding information includes a type of picture, a quantizer matrix (Quant), and a type of discrete cosine transform (DCT).

When it is required for the encoder to change a bit rate used in coding of one of the first and second streams in an re-encoding operation on the at least one of the first and second streams, the encoder uses a Quant which is changed according to a relation below after-change Quant=before-change Quant×(after-change bit rate/before-change bit rate Decoded video and/or audio data and the coding information may be transferred to the encoder through two separate signal lines from the first and second decoders disposed in an independent unit.

The apparatus may further include a demultiplexer means splitting the first and second streams into video packets and audio packets and a multiplexing means multiplexing the video packets in one of the first and second streams and the audio packets in the other stream.

When the portion which is to be combined in the third stream is defined in the trailing segment of the first stream, the encoder may re-encode the portion after completion of editing of the second stream.

The controller, in producing the third stream, may select a first portion of the leading segment of the first stream before decoded and re-encoded, a second portion of the leading segment of the first stream following the first portion and preceding the edit point which is outputted from the encoder, a first portion of the trailing segment of the second stream following the edit point which is outputted from the encoder, and a second portion of the trailing segment of the second stream following the first portion of the second stream before decoded and re-encoded. The controller defines a range of the second portion of the first stream from the edit point to a leading portion of one of the GOPs in which the edit point is set and a range of the first portion of the second stream from the edit to an end of one of the GOPs in which the edit point is set.

According to the second aspect of the invention, there is provided a stream editing method of switching one of two input streams used in an editing operation to the other at an edit point set in each of the input streams. The method comprises the steps of: (a) decoding a first and a second stream using two decoders; (b) re-encoding at least one of the first and second streams decoded in the decoding step; and (c) controlling editing of the first and second streams to produce a third stream made up of a combination of a leading segment of the first stream preceding the edit point set in the first stream and a trailing segment of the second stream following the edit point set in the second stream, the controlling step, in producing the third stream, combining a portion of at least one of the leading and trailing segments of the first and second streams which is decoded and re-encoded and which is defined to have a given length from the edit point set in the one of the first and second streams with other portions of the leading and trailing segments of the first and second streams before decoded and re-encoded.

In the preferred mode of the invention, each of the first and second streams is made up of a plurality of groups of pictures (GOP). The length of the portion which is decoded and re-encoded and which is to be combined in the third stream is defined from edit point to a leading portion of one of the GOPs in which the edit point is set.

The method may further include the step of generating a series of headers for the third stream.

The encoding step re-encodes the at least one of the first and second streams using coding information derived by decoding the at least one of the first and second streams through the decoding step.

The coding information includes a type of picture, a quantizer matrix (Quant), and a type of discrete cosine transform (DCT).

When it is required for the encoding step to change a bit rate used in coding of one of the first and second streams, the encoding step uses a Quant which is changed according to a relation below after-change Quant=before-change Quant×(after-change bit rate/before-change bit rate The method may further includes the step of splitting the first and second streams into video packets and audio packets and the step of multiplexing the video packets in one of the first and second streams and the audio packets in the other stream.

When the portion which is to be combined in the third stream is defined in the trailing segment of the first stream, the encoding step may re-encode the portion after completion of editing of the second stream.

The controlling step, in producing the third stream, may select a first portion of the leading segment of the first stream before decoded and re-encoded, a second portion of the leading segment of the first stream following the first portion and preceding the edit point which is decoded and re-encoded, a first portion of the trailing segment of the second stream following the edit point which is decoded and re-encoded, and a second portion of the trailing segment of the second stream following the first portion of the second stream before decoded and re-encoded. The range of the second portion of the first stream is defined from the edit point to a leading portion of one of the GOPs in which the edit point is set. The range of the first portion of the second stream is defined from the edit to an end of one of the GOPs in which the edit point is set.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
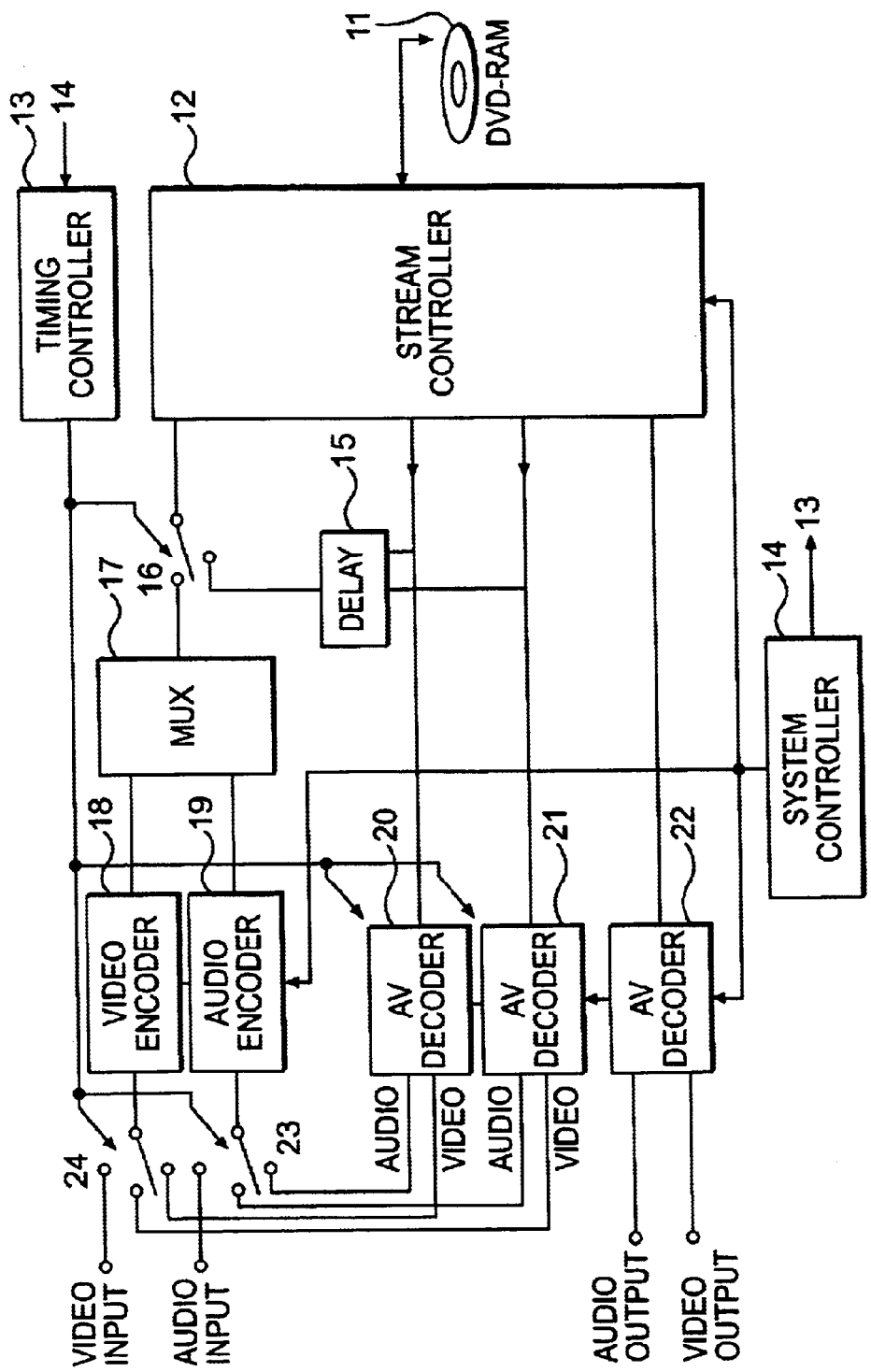
FIG. 1 is a block diagram which shows an editing system according to the first embodiment of the invention.

Referring now to the drawings, wherein like numbers refer to like parts in several views, particularly to FIG. 1, there is shown an editing system according to the present invention which is designed to edit streams read out of a DVD-RAM 11 and restore them in the DVD-RAM 11.

The editing system includes generally a stream controller 12 controlling reading and writing of streams from and in the DVD-RAM 11, two AV decoders 20 and 21 decoding the streams to produce video and audio signals, a video encoder 18 re-encoding the video signals to produce a video elementary stream (ET), an audio encoder 19 re-encoding the audio signals to produce an audio elementary stream, a multiplexer 17 multiplexing the video and audio elementary streams to produce a packed stream, a delay circuit 15, an AV encoder 22 decoding audio and video signals for visually monitoring them, a switch 24 selecting the video signals to be inputted to the video encoder 18, a switch 23 selecting the audio signals to be inputted to the audio encoder 19, a switch 16 selecting one of the streams outputted from the multiplexer 17 and the delay circuit 15, a timing controller 13 controlling operations of the switches 16, 23, and 24, and a system controller 14 controlling the whole operation of this system.

Figure 2:
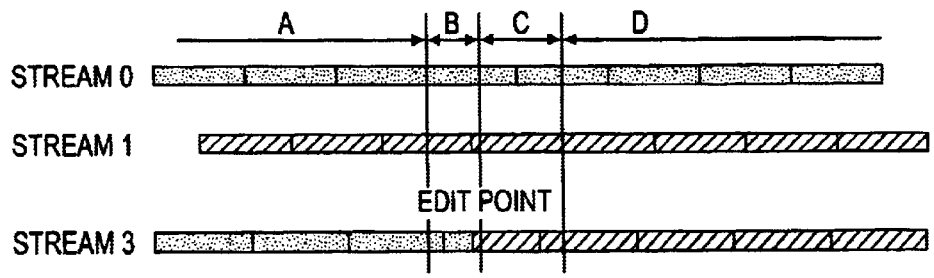
FIG. 2 shows streams 0 and 1 edited by an editing system and a stream 3 formed by an edited combination of the streams 0 and 1.

FIG. 2 shows streams to be handled by the editing system of this embodiment.

The editing system combines segments A and B of a stream 0 with segments C and D of a stream 1 to produce a stream 3. Between the segments B and C, an edit point is set in each of the streams 0 and 1. In the following discussion, it is assumed that information on the edit points is inputted by an editing operator or other external device to the system controller 14 before start of the editing operation. Each of smaller sections of the stream 0, 1, and 3 split at regular intervals forms a group of pictures (GOP). A leading portion of each GOP contains an I-picture. In the shown case, the edit point in each stream is fixed in one GOP at a given interval away from the leading portion thereof. The segment B is defined from the edit point to a leading portion of one of GOPs in which the edit point is fixed. The segment A is made up of GOPs preceding the segment B. The segment C is defined from the edit point to an end of one of the GOPs in the stream 1 in which the edit point is fixed. The segment D is made up of GOPs following the segment C.

In the editing operation to produce the stream 3, the segment A of the stream 0 read out of the DVD-RAM 11 is used as it is, while the segment B is used after decoded by the AV decoder 20 and re-encoded through the video and audio encoders 18 and 19. The segment C of the stream 1 read out of the DVD-RAM 11 is used after decoded by the AV decoder 21 and re-encoded through the video and audio encoders 18 and 19, while the segment D is used as it is. Specifically, of the four segments A, B, C, and D, only the segments B and C are used after re-encoded in producing the stream 3. This results in decreased degradation of image quality of the stream 3.

The stream controller 12 reads the streams 0 and 1 out of the DVD-RAM 11 and outputs them with timing where the edit point in the stream 0 coincides with that in the stream 1. The AV encoder 20 decodes the stream 0 outputted from the stream controller 12, while the AV encoder 21 decodes the stream 1 outputted from the stream controller 12.

The timing controller 13 is responsive to control signals outputted, in sequence, from the system controller to operate the switch 16.

First, the timing controller 13 operates the switch 16 so as to transfer the segment A of the stream 0 outputted from the delay circuit 15 to the stream controller 12. Specifically, the segment A of the stream 0 read out of the DVD-RAM 11 through the stream controller 12 is subjected to a time delay in the delay circuit 15 and returned back to the DVD-RAM 11 as it is.

Subsequently, the timing controller 13 operates the switch 16 to establish communication between the stream controller 12 and the multiplexer 17 and also operates the switches 23 and 24 to establish communications between the audio encoder 19 and the AV decoder 20 and between the video encoder 18 and the AV decoder 20. Specifically, the video data and the audio data in the segment B of the stream 0 decoded by the AV decoder 20 are re-encoded by the video encoder 18 and the audio encoder 19, respectively.

The video encoder 18 and the audio encoder 19, as described above, produce the video and audio elementary streams, respectively. These elementary streams are multiplexed in the multiplexer 17 to produce a packed stream, which is, in turn, transferred to the stream controller 12 through the switch 16 and recorded in the DVD-RAM 11 following the segment A of the stream 0. The delay circuit 15 subjects a time delay to the data in the segment A which is equivalent to the length of time required for decoding, encoding, and multiplexing of the data in the segment B.

Subsequently, the timing controller 13 selects communications between the audio encoder 19 and the AV decoder 21 and between the video encoder 18 and the AV decoder 21 through the switches 23 and 24 to re-encode the video data and audio data in the segment C of the stream 1 outputted from the AV decoder 21. The video and audio elementary streams outputted from the video and audio encoders 18 and 19 are multiplexed in the multiplexer 17 to produce a packed stream, which is, in turn, transferred to the stream controller 12 through the switch 16 and recorded in the DVD-RAM 11 following the segment B of the stream 0.

Finally, the timing controller 13 operates the switch 16 so as to transfer the segment D of the stream 1 outputted from the delay circuit 15 directly to the stream controller 12. Specifically, the segment D of the stream 1 read out of the DVD-RAM 11 through the stream controller 12 is subjected to a time delay in the delay circuit 15 and recorded in the DVD-RAM 11 again following the segment C of the stream 1. The delay circuit 15 subjects a time delay to the data in the segment D which is equivalent to the length of time required for decoding, encoding, and multiplexing of the data in the segment C.

The use of the two decoders 20 and 21 enables edition of streams in real time. The use of only the segments B and C in producing the stream 3 which are re-encoded by the encoders 18 and 19 enables the two streams 0 and 1 to be coupled to each other without a great deterioration in image quality.

The segment A of the stream 0 may not alternatively be rewritten into the DVD-RAM 11. In this case, a sequence of the re-encoded segments B and C is recorded on an area of the DVD-RAM 11, for example, following an area on which the segment A is recorded originally, and the segment D is copied to a suitable area on the DVD-RAM 11.

In the above discussion, it is assumed that the edit points of the streams 0 and 1 are each set within one of GOPs, but there is a possibility that one of the edit points is set just between adjacent two of the GOPs. For instance, if the edit point of the stream 0 is set at the end of the last GOP of the segment A, a portion of the stream 1 following the segment B, as shown in FIG. 2, is used in producing the stream 3. Specifically, the stream 0 before re-encoded is used as it is in producing the stream 3, while only a portion of the stream 1 ranging from the edit point thereof to the end of one of the GOPs in which the edit point is set is used after it is re-encoded.

An editing system of the second embodiment will be described below which is designed to re-edit header information for enabling a simple decoder to decode combined streams correctly.

In the first embodiment, the streams 0 and 1 are coupled together to produce the stream 3, which may result in discontinuity of PTSs and frame numbers contained in headers of packets between the streams 1 and 0. When decoding the stream 3, a decoder, thus, needs to analyze the discontinuous PTSs and frame numbers for reproducing images in a correct sequence and establishing synchronization of reproduced sound with the images.

Figure 3:
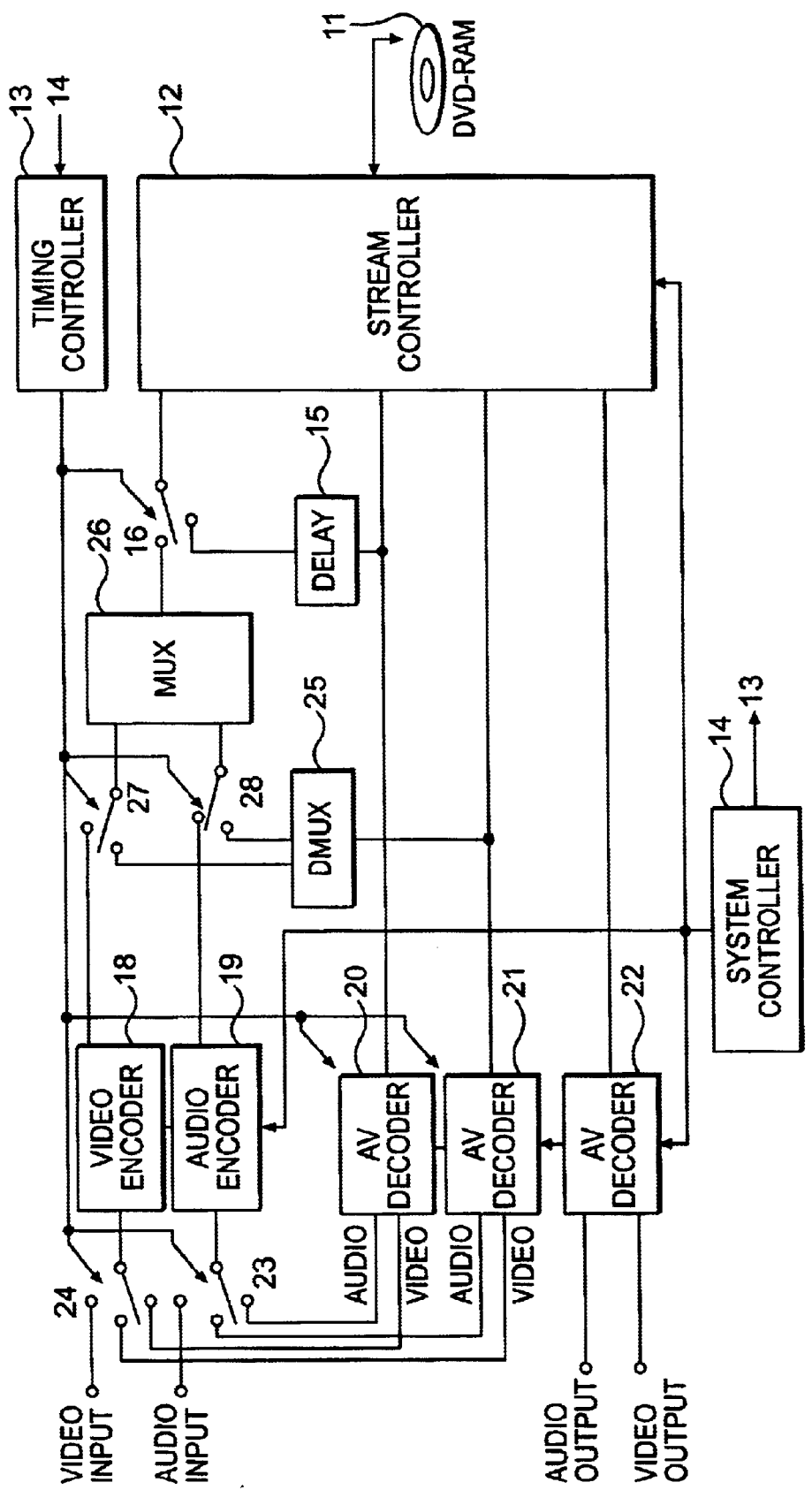
FIG. 3 is a block diagram which shows an editing system according to the second embodiment of the invention.

The editing system of this embodiment includes, as shown in FIG. 3, a demultiplexer 25, a multiplexer 26, and switches 27 and 28. The demultplexer 25 separates the stream 1 outputted from the stream controller 12 into video packets and audio packets. The multiplexer 26 reattaches headers to inputted video and audio packets. The delay circuit 15 is connected between the switch 16 and a signal line extending from the stream controller 12 to the AV decoder 20. Other arrangements are identical with those in the first embodiment, as shown in FIG. 1, and explanation thereof in detail will be omitted here.

Figure 4:
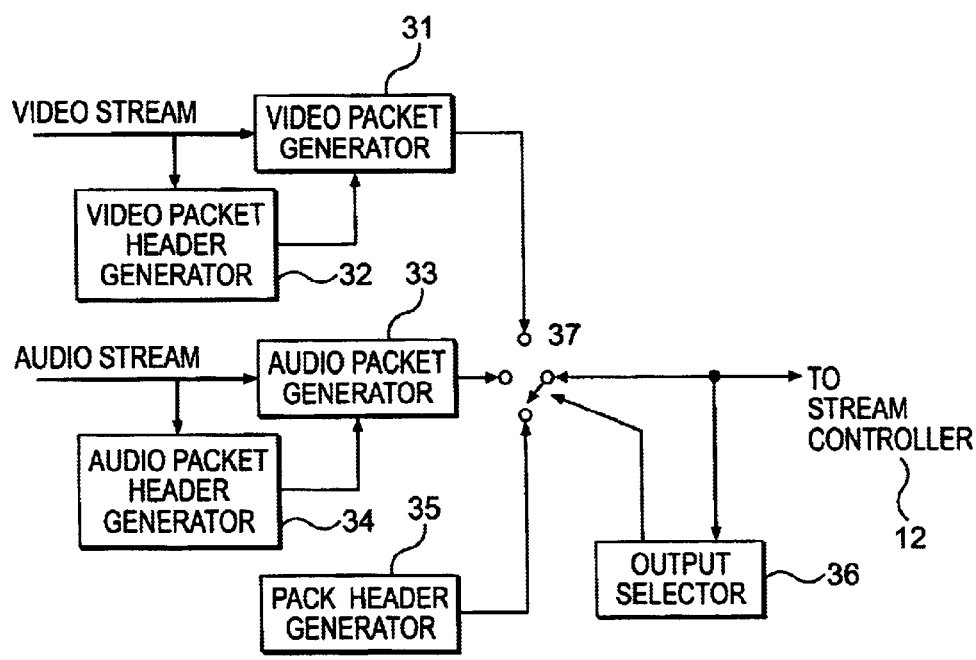
FIG. 4 is a block diagram which shows a circuit structure of a multiplexer in the editing system shown in FIG. 3.

The multiplexer 26, as shown in FIG. 4, consists of a video packet header generator 32 generating video packet headers, a video packet generator 31 generating video packets using the headers made by the video packet header generator 32, an audio packet header generator 34 generating audio packet headers, an audio packet generator 33 generating audio packets using the headers made by the audio packet header generator 34, a pack header generator 35 generating pack headers, an output selector 36 determining the type of packet to be multiplexed in a pack, and a switch 37 selecting one of outputs from the video packet generator 31, the audio packet generator 33, and the pack header generator 35 specified by the type of packet determined by the output selector 36.

The segment A of the stream 0 is, like the first embodiment, inputted directly to the stream controller 12 through the delay circuit 15 and the switch 16.

Subsequently, the segments B of the stream 0 and the segment C of the stream 1 are combined following the segment A. Specifically, the timing controller 13 operates the switches 27 and 28 to establish communications between the multiplexer 26 and the video encoder 18 and between the multiplexer 26 and the audio encoder 19. The video elementary stream produced by the video encoder 18 and the audio elementary stream produced by the audio encoder 19 are, thus, supplied to the multiplexer 26.

The video packet header generator 32 of the multiplexer 26 produces packet headers for the inputted video elementary stream. The video packet generator 31 separates the video elementary stream into video packets and adds to them the packet headers made by the video packet header generator 32 to output the video packets with the headers to the switch 37.

Similarly, the audio packet header generator 34 produces packet headers for the inputted audio elementary stream. The audio packet generator 33 splits the audio elementary stream into audio packets and adds to them the packet headers made by the audio packet header generator 34 to produce the audio packets with the headers to the switch 37.

The pack header generator 35 produces headers for packs.

Figure 9:
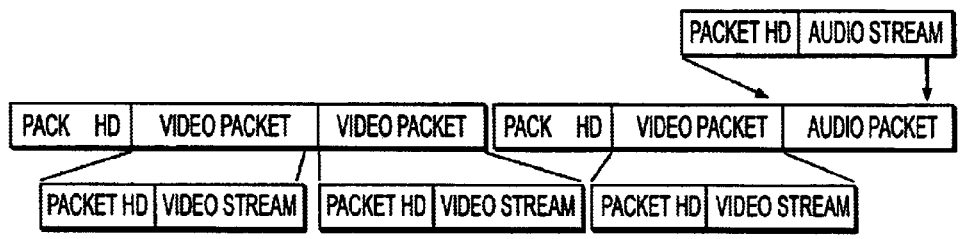
FIG. 9 shows a packed stream.
Figure 10A:
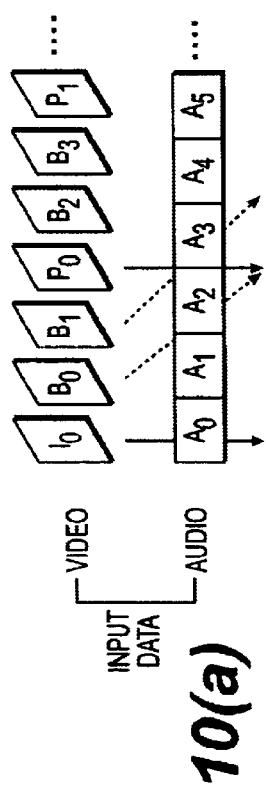
FIGS. 10(a) to 10(d) show a sequence of processes which adds audio data to video data to produce a data stream in a format suitable for a storage medium.
Figure 10B:
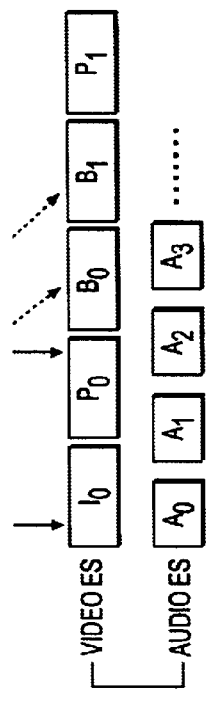
Figure 10C:
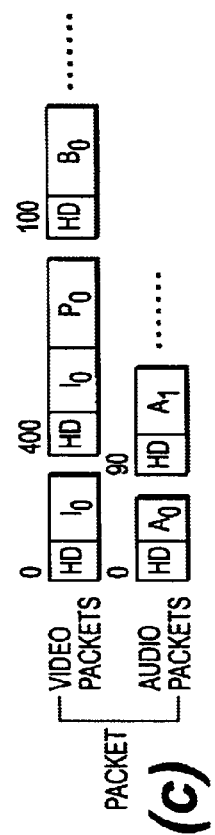
Figure 10D:

The output selector 36 monitors an output from the switch 37 to the stream controller 12 while simulating a buffering operation of a preselected ideal decoder and operates the switch 37 to select one of the outputs from the video packet generator 31, the audio packet generator 33, and the pack header generator 35 which is to follow the output transmitted to the stream controller 12, thereby transmitting a packed stream such as the one shown in FIG. 9, to the stream controller 12.

The demultiplexer 25 splits the segment D of the stream 1 into video packets and audio packets and outputs them to the multiplexer 26 through the switches 27 and 28, respectively.

The video packet header generator 32 produces headers for the video packets inputted from the demultiplexer 25. The video packet generator 31 replaces the header of each of the inputted video packets with one of the headers outputted from the video packet header generator 32 to output the header-replaced video packets.

Similarly, the audio packet header generator 34 produces headers for the audio packets inputted from the demultiplexer 25. The audio packet generator 33 replaces the header of each of the inputted audio packets with one of the headers outputted from the audio packet header generator 34 to output the header-replaced audio packets.

The output selector 36, similar to the above, determines the type of packet to be included in a pack and operates the switch 37 to produce a packed stream.

As can be seen from the above discussion, the editing system of this embodiment reattaches headers to the packets in the segment D as well as the segments B and C. The addition of frame numbers and PTSs continued from those in headers of the segment A of the stream 0 to the headers of the segments B, C, and D, thus, allows a complete stream to be formed.

An editing system of the third embodiment will be described below which is designed to minimize the deterioration in image quality caused by the re-encoding operation.

Figure 5:
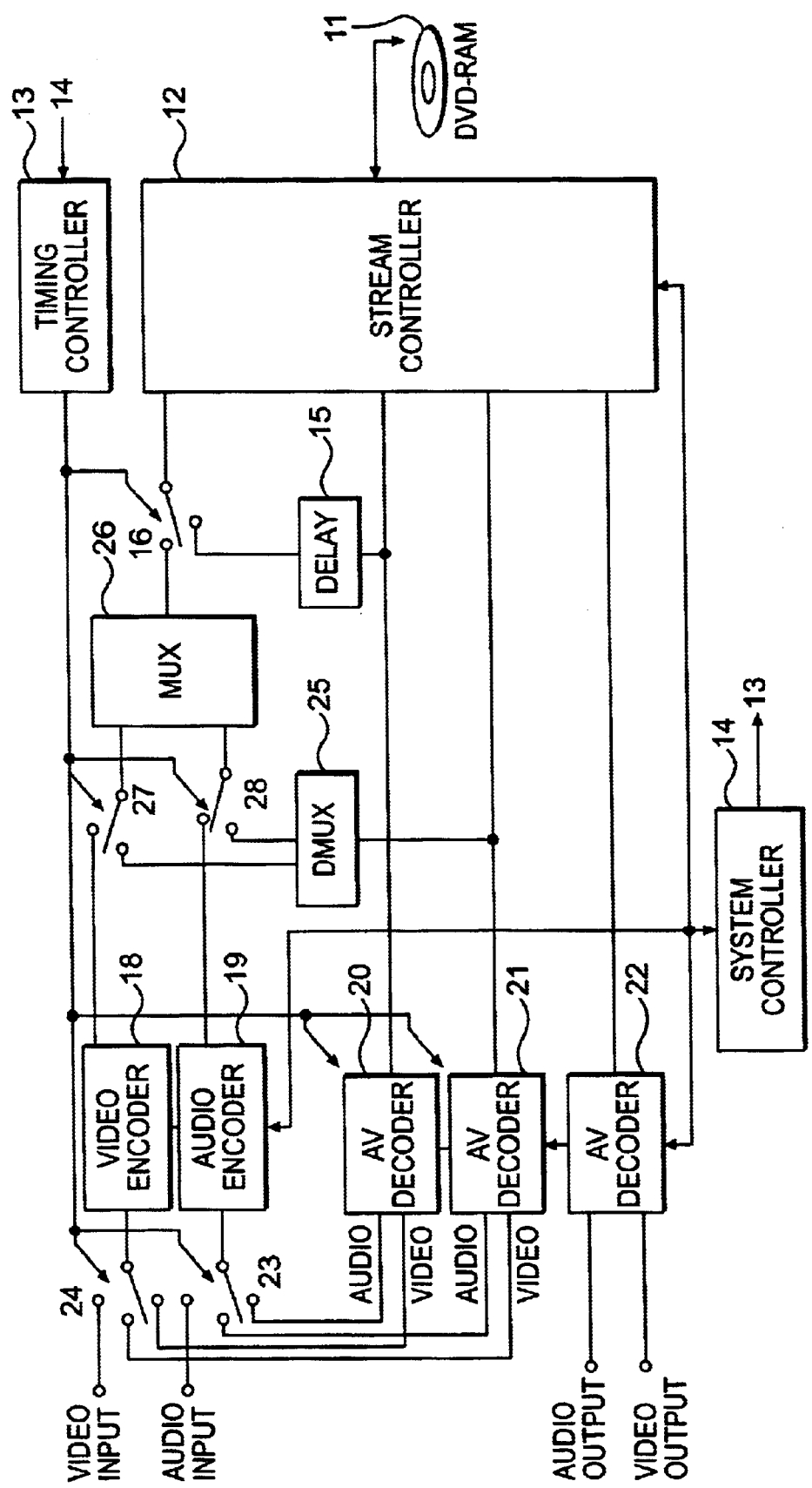
FIG. 5 is a block diagram which shows an editing system according to the third embodiment of the invention.

FIG. 5 shows the editing system of this embodiment which is different from the second embodiment in FIG. 3 only in that the system controller 14 fetches parameters used in decoding from the decoders 20, 21, and 22 to control operations of the encoders 18 and 19. Other arrangements and operations are identical, and explanation thereof in detail will be omitted here.

Figure 11:
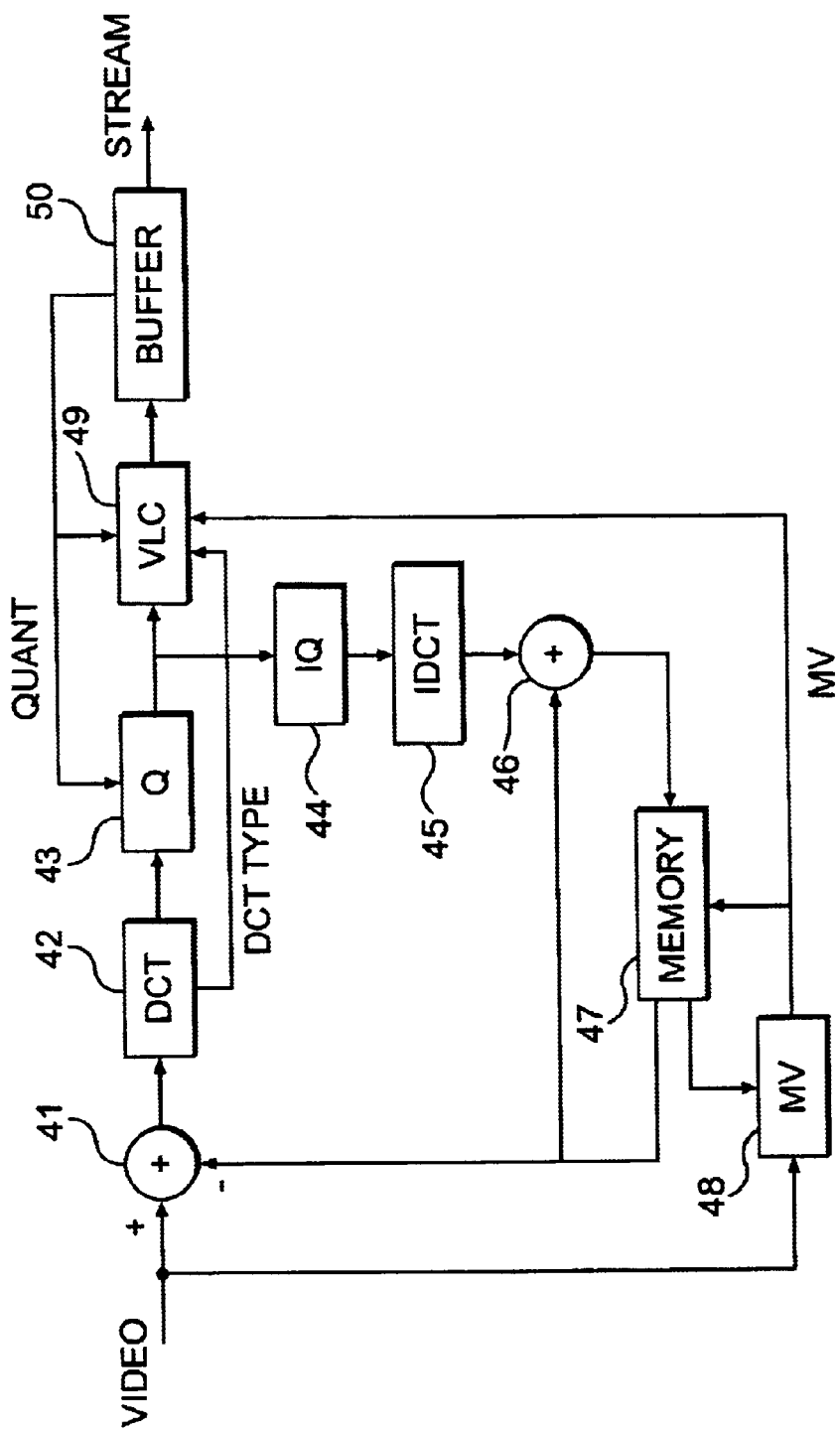
FIG. 11 is a block diagram which shows a conventional editing system.

Coding of moving pictures is usually achieved by, as already discussed in FIG. 11, using parameters such as the type of picture, the quantizer matrix (Quant), the type of DCT, the motion vector (MV), and the type of macroblock (MB). An encoder side transmits information on these parameters to a decoder side. The decoder side decodes input data using the received information.

The type of picture indicates one of I-, P-, and B-pictures and is expressed in two bits per frame.

The quantizer matrix (Quant) is made up of parameters each specifying the quantization step and expressed in five bits per macroblock (MB).

The type of DCT indicates whether a DCT is a frame DCT or a field DCT and is expressed in one bit per MB.

The motion vector (MV) is expressed in 6 or more bits per MB.

The type of MB indicates a coding mode of the MB and is expressed in 1 to 8 bits per MB.

The deterioration in image quality arising when the video data decoded by the decoders 20 and 21 is re-encoded by the video encoder 18 may be reduced by reusing the parameters used in a coding operation prior to the decoding operation of the decoders 20 and 21. This is because the reuse of the same parameters in the video encoder 18 enables the same coding operation as that to which the video data was subjected previously.

Specifically, the system controller 14 fetches information on the above described parameters decoded in the decoders 20, 21, and 22 and transmits it to the video encoder 18. The video encoder 18 produces the same parameters as those used in the coding operation to which the inputted video data was subjected previously based on the received information and re-encodes the video data using them, thereby resulting in a decreased deterioration in image quality.

The video encoder 18 may use only the information on the type of picture, the quantizer matrix (Quant), and the type of DCT.

Figure 6:
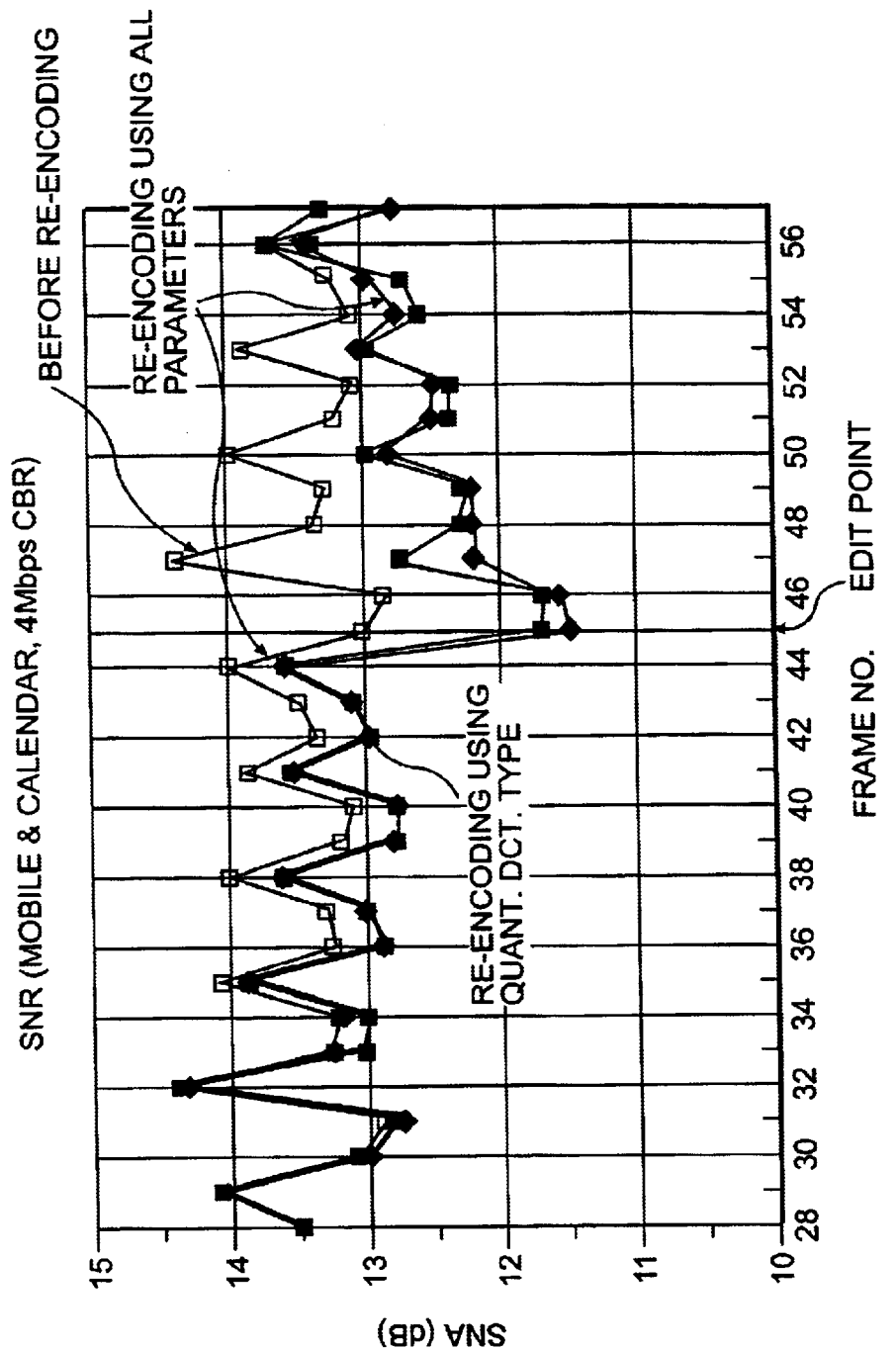
FIG. 6 is a graph which shows plots SNRs when the same parameters as those used in a previous coding operation are all used, when only the same parameters indicative of the type of picture, the quantizer matrix (Quant), and the type of DCT as those used in the previous coding operation, and when the same parameters are not used at all.

FIG. 6 is a graph which plots SNRs when the same parameters as those used in the previous coding operation are all used, when only the same parameters indicative of the type of picture, the quantizer matrix (Quant), and the type of DCT as those used in the previous coding operation, and when the same parameters are not used at all.

The graph shows that the use of only the same parameters indicative of the type of picture, the quantizer matrix (Quant), and the type of DCT as those used in the previous coding operation realizes substantially the same SNR as that when all the same parameters are used. Further, these three parameters are smaller in used amount of data than the other parameters indicating the MV and the type of MB, so that the transmission of the information from the system controller 14 to the video encoder 18 can be performed effectively.

It is often the case where the bit rate (will be referred to as an original bit rate below) in the coding operation prior to the decoding operation needs to be changed in the re-encoding operation. For instance, connecting two streams different in bit rate from each other requires re-encoding one of the streams to bring the bit rate thereof into agreement with the bit rate of the other stream. When such a case is encountered, the editing system of this embodiment modifies each value of the quantizer matrix (Original Quant) according to the relation below to produce a new quantizer matrix (New Quant).

Original Bit Rate:New Bit Rate=Original Quant:New Quant Thus,
New Quant=Original Quant×(New Bit Rate/Original Bit Rate)

The video encoder 18 re-encodes the video data using the changed quantizer matrix (New Quant), thereby enabling the bit rate to be changed without sacrificing the improvement of deterioration in image quality. Usually, in the encoding operation prior to the decoding operation, quantization steps for an inconspicuous portion of image data are increased to increase the compression ratio, while quantization steps for a conspicuous portion of the image data are decreased to improve the image quality. The modification of the quantizer matrix according to the above equation enables the bit rate to be changed while keeping the above increase in compression ratio and improvement of the image quality as they are.

Specifically, the inconspicuous portion of the image data which is coded in increased quantization steps contains invisible yet many noises, while the conspicuous portion which is coded in decreased quantization steps contains many noise-less signal components. The noises in the inconspicuous portion need not be re-encoded completely, thus allowing the quantization steps to be increased to increase the compression ratio. Conversely, the conspicuous portion needs to minimize an increase in noise, thus requiring a decrease in quantization step. Therefore, the change of the quantizer matrix (Quant) using the above equation enables the re-encoding in the encoder 18 without sacrificing the image quality.

The manner to avoid the deterioration in image quality using the same parameters as those used in the previous coding operation may also be used in conventional systems equipped with two separate units: an MPEG stream reproducer with a monitor and an editor re-encoding reproduced images. This type of system transfers video and audio signals reproduced by the reproducer to the editor. The video signals transferred to the editor is changed by a switching operation in the reproducer.

In use of the above manner, a parameter transfer cable is connected between the reproducer and the editor for transferring five parameters indicative of the type of picture, the quantizer matrix (Quant), the type of DCT, the motion vector (MV), and the type of macroblock (MB) or three parameters indicative of the information on the type of picture, the quantizer matrix (Quant), and the type of DCT. In order to prevent relations between the parameters and video frames from becoming obscure, IDs and PTSs contained in a reproduced stream are transmitted to the editor through a data transfer cable connecting between the reproducer and the editor in a blanking period of flow of a video signal and also added to the parameters transmitted through the parameter transfer cable.

Figure 7:
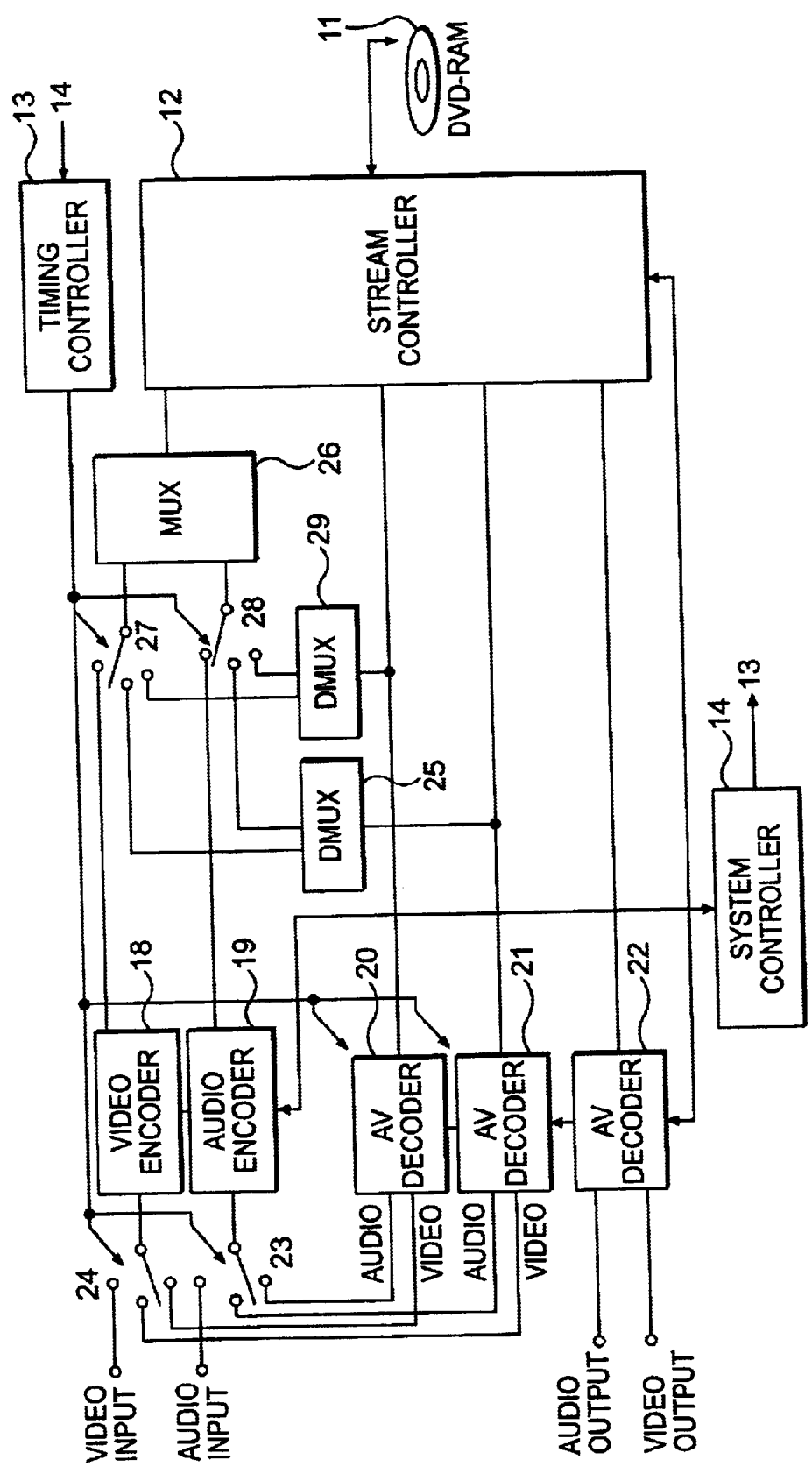
FIG. 7 is a block diagram which shows an editing system according to the fourth embodiment of the invention.

FIG. 7 shows an editing system according to the fourth embodiment which is capable of re-recording audio data.

The editing system of this embodiment includes a demultiplexer 25 separating the stream 1 into video packets and audio packets, a demultiplexer 29 separating the stream 0 into video packets and audio packets, and switches 27 and 28 selecting one of outputs from the video encoder 18, the demultplexer 25, and the demultplexer 29 and one of outputs from the audio encoder 19, the demultplexer 25, and the demultiplexer 29, repectively. Other arrangements are identical with those in the second embodiment, and explanation thereof in detail will be omitted here.

Figure 8:
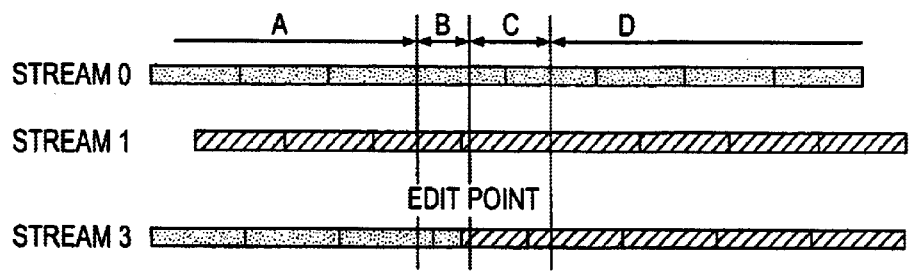
FIG. 8 shows streams 0 and 1 edited by the editing system of the fourth embodiment in FIG. 7 and a stream 3 formed by an edited combination of the streams 0 and 1.

Outputs from the switches 27 and 28 are packed by the multiplexer 26 and outputted in the form of a stream to the stream controller 12. Specifically, the segments A, B, and C of the stream 3 are, as shown in FIG. 8, formed similar to the first embodiment, while the segment D of the stream 3 is formed by selecting the video packets in the segment D of the stream 1 through the switch 27 and the audio packets in the segment D of the stream 0 through the switch 28 to produce a stream consisting of a combination of the video packets in the stream 1 and the audio packets in the stream 0. The segment A of the stream 0, like the first embodiment, may not be rewritten into the DVD-RAM 11.

The editing operation according to the fifth embodiment will be described below which is executed in a case where an editing operator edits steams read out of the DVD-RAM while watching a monitor.

The editing operation in the first embodiment is performed in a case where the edit point is known in advance. It is, therefore, possible to re-encode the segment B of the stream 0 from the leading portion thereof. However, in a case where an editing operator sets the edit point while watching a monitor, data on the edit point is not inputted to the editing system in advance. The editing operation in such a case will be described with reference to FIGS. 1 and 2.

The editing operation to edit the segment A of the stream 0 is identical with that in the first embodiment. When editing the segment B of the stream 0, the editing system does not know the edit point, so that the editing system cannot identify the segment B of the stream 0. The same editing operation as that handling the segment A, thus, continues, so that a sequence of the segments A and B of the stream 0 is recorded in the DVD-RAM 11.

When the editing operator fixes the edit point, the timing controller 13 operates the switches 23 and 24 to connect the audio encoder 19 and the video encoder 18 to the AV decoders 21 and also operates the switch 16 to connect the multiplexer 16 to the stream controller 12. Data of the segment C of the stream 1 decoded by the AV decoder 21 is, thus, re-encoded in the video encoder 18 and the audio encoder 19 and then transmitted and recorded in the DVD-RAM 11 through the multiplexer 17, the switch 16, and the stream controller 12. The editing operation to edit the segment D of the stream 1 is identical with that in the first embodiment.

After completion of decoding of the segment C of the stream 1, the timing controller 13 operates the switch 16 so as to transfer the segment D of the stream 1 outputted from the delay circuit 15 directly to the stream controller 12 in the same manner as that in the first embodiment, thereby recording the segment D in the DVD-RAM 11 following the segment C.

Once the edit point is fixed, it becomes possible to define the range of the segment B of the stream 0, as discussed above. Therefore, after completion of editing of the streams 0 and 1 in the above manner, the editing system reads out the data in the segment B of the stream 0 again, decodes, encodes, and re-write it in a corresponding area on the DVD-RAM 11.

As discussed above, in the case where the edit point is not fixed in advance, the streams 0 and 1 are first rewritten in the DVD-RAM 11 without re-encoding the segment B of the stream 0, after which the segment B of the stream 0 is re-encoded to interpolate the stream. Usually, the length of the segment B corresponds to as long as 0.5 sec. The editing operator, thus, feels the editing operation to be carried out in real time.

If the segment B of the stream 0 is not re-encoded, it may cause images being reproduced to undergo distortion. This is because the sequence of coded pictures, as discussed in FIGS. 10($a$) to 10($d$), is not identical with that of frames of original pictures, so that when one GOP is cut, it will cause several frames needed for reproduction to disappear. The re-encoding of the segment B of the stream 0 avoids the distortion of images when reproduced.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A stream editing method of switching one of two input streams used in an editing operation to the other at an edit point set in each of the input streams, comprising the steps of:

decoding a first and a second stream using two decoders;

re-encoding at least one of the first and second streams decoded in said decoding step;

controlling editing of the first and second streams to produce a third stream made up of a combination of a leading segment of the first stream preceding the edit point set in the first stream and a trailing segment of the second stream following the edit point set in the second stream, said controlling step, in producing the third stream, combining a portion of at least one of the leading and trailing segments of the first and second streams which is decoded and re-encoded and which is defined to have a given length from the edit point set in the one of the first and second streams with the other portions of the leading and trailing segments of the first and second streams before decoded and re-encoded;

wherein said encoding step re-encodes the at least one of the first and second streams using coding information derived by decoding the at least one of the first and second streams through said decoding step;

wherein the coding information includes a type of picture, a quantizer matrix (Quant), and a type of discrete cosine transform (DCT);

further wherein when it is required for said encoding step to change a bit rate used in coding of one of the first and second streams, said encoding step uses a Quant which is changed according to a relation below after-change Quant=before-change Quant×(after-change bit rate before-change bit rate.

2. A stream editing apparatus designed to switch one of two input streams used in an editing operation to the other at an edit point set in each of the streams comprising:

a first decoder decoding a first stream;

a second decoder decoding a second stream;

an encoder re-encoding at least one of the first and second streams decoded by the first and second decoders; and a controller controlling editing of the first and second streams to produce a third stream made up of a combination of a leading segment of the first stream preceding the edit point set in the first stream and a trailing segment of the second stream following the edit point set in the second stream, the controller, in producing the third stream, combining a portion of at least one of the leading and trailing segments of the first and second streams which is decoded and re-encoded by a corresponding one of the first and second decoders and the encoder and which is defined to have a given length from the edit point set in the one of the first and second streams with other portions of the leading and trailing segments of the first and second streams before decoded and re-encoded by the first and second decoders and the reencoder; wherein the encoder re-encodes the at least one of the first and second streams using coding information derived by decoding the at least one of the first and second streams through the first and second decoders; wherein the stream editing apparatus the coding information includes a type of picture, a quantizer matrix (Quant), and a type of discrete cosine transform (DCT); and further wherein when it is required for the encoder to change a bit rate used in the coding of one of the first and second streams in a re-encoding operation on the at least one of the first and second streams, the encoder uses a quantizer matrix (Quant) which is changed according to a relation below:

After-change Quant=before-change Quant×(after-change bit rate/before-change bit-rate).

* * * * *